Patented Aug. 18, 1936

2,051,057

UNITED STATES PATENT OFFICE 2,051,057

ART OF DESTROYING INSECTS AND THE LIKE

Robert Marshall Pettit, New York, N. Y., assignor to Ray-D-Ize Corporation, New York, N. Y., a corporation of New York No Drawing. Application November 13, 1934, Serial No. 752,830

6 Claims. (Cl. 21—18)

My present invention relates to the art of destroying or producing a lethal condition in living organisms such as insects, micro-organisms, parasites, fungi, bacteria and the like by irradiation, such destruction or lethal condition being created by the action of that radiation manifested by that portion of the radiant light or energy spectrum generally known as the infra-red.

I have discovered that when insects, micro-organisms, parasites, fungi, bacteria and the like are irradiated by exposure to infra-red rays that a lethal condition is produced.

By infra-red radiations or rays, as herein used, I refer to that band of light or energy radiation commonly referred to as the invisible heat radiation or the infra-red spectrum.

I have also found that that portion of said band of light having wave lengths of from approximately seven thousand seven hundred Angstrom units to approximately twenty-six thousand Angstrom units to be especially adaptable to the killing of living organisms. This latter range of wave lengths has often been referred to as the "penetrating ray zone" of the infra-red spectrum.

While I herein specifically refer to invisible heat radiation or to the infra-red spectrum, or portions thereof, I do not intend to so limit my present invention because I have obtained excellent results in cases where visible and/or ultraviolet wave lengths accompany the infra-red wave lengths to which the organisms are subjected.

More specifically I have discovered that maximum lethal conditions may most advantageously be produced by the use of optimum wave lengths and intensities of radiations produced within the infra-red spectrum,—such optimum conditions differing for different classes and types of living organisms.

I have also found that by the use of reflectors, screens, shields and filters, singly or in combination, as well as by the particular design of the devices used for the production of infra-red radiations, that wave lengths and intensities, most efficient to produce lethal conditions over wide ranges of varying characteristics of living organisms, may be most advantageously made available for practical applications. For example, I have found that only a limited period of infra-red radiations from seven thousand seven hundred Angstrom units to fourteen thousand Angstrom units is necessary to produce a lethal result in soft bodied insects such as, to use their common names, the bed-bug, the water-bug, the mosquito and insects of their general classes. Insects having body coatings or structural encasements of greater thickness and of a more dense and protective nature, may require longer periods, greater intensities, or specific wave lengths within relatively narrow limits, to produce a lethal condition in minimum time. As an example of these latter named organisms I might mention the meal worm and the hard shelled beetle.

The variable requirements to produce a lethal condition in living organisms, as herein contemplated, is to a very large degree, if not entirely, determined by the infra-red absorption characteristics of the particular organism being irradiated upon by a given infra-red wave length, or wave lengths, at given intensities,—lethality being most quickly obtained at the wave lengths of maximum infra-red absorption and optimum intensities.

The bio-chemical, physio-chemical, physiological, or other reasons causing a lethal condition within the organisms due to infra-red irradiation are not known to me, but I do know that such lethal conditions are produced by and because of the action of the infra-red radiations to which the organisms are subjected.

In referring to the classifications of living organisms herein, I do so in a generic and all inclusive zoological, botanical, biological, and bacteriological sense.

The application of my invention to various types and kinds of living organisms may include the killing of insects, vermin, fungi, micro-organisms, bacteria and the like in the home and industry, the control of such organisms in agriculture, in the fur and leather industries, in the food and cereal grain industries and in the purification of liquids and solids, but other applications may be made to other classifications and types of organisms without departing from the scope and spirit of my invention.

I claim:—

1. The method of destroying living organisms by irradiation, which consists in subjecting said organisms to the action of infra-red radiations, said infra-red radiations consisting substantially of radiations having wave lengths of between 7,700 and 26,000 Angstrom units and being varied as to wave lengths and intensities within said band depending upon the anatomical and/or life structural characteristics of the said organisms to be destroyed.

2. The method of destroying living organisms of the lower orders by irradiation, which consists of subjecting said organisms to the action of infra-red radiations, said radiations consisting substantially entirely of radiations having wave lengths of between 7,700 and 14,000 Angstrom units and being varied as to wave lengths and intensities within said band in accordance with the radiation absorption characteristics of the said organisms to be destroyed.

3. The method of destroying insects and the like by irradiation, which consists of generating infra-red rays consisting substantially of wave lengths of from seven thousand seven hundred Angstrom units to fourteen thousand Angstrom units, and collecting and directing said rays against said insects for a sufficient period of time to cause the death thereof.

4. The method of destroying insects and the like by irradiation which consists of subjecting said insects to the action of infra-red radiations, said infra-red radiations consisting substantially entirely of such wave lengths and intensities as to fall within the limits of 7,700 and 26,000 Angstrom units, whereby optimum absorption by said organisms in the shortest period of time is obtained.

5. The method of destroying living organisms by irradiation, which consists in subjecting said organisms to the action of infra-red radiations, said infra-red radiations having wave lengths of between 7,700 and 14,000 Angstrom units and being varied as to wave lengths and intensity within said band depending upon the anatomical and/or life structural characteristics of the said organisms.

6. The method of destroying insects and the like by irradiation, which consists of generating infra-red radiations consisting substantially of wave lengths of from 7,700 to 26,000 Angstrom units, and collecting and directing said radiations against said insects for a sufficient period of time to cause death thereof.

ROBERT MARSHALL PETTIT.